(12) United States Patent
Jo et al.

(10) Patent No.: US 8,798,369 B2
(45) Date of Patent: Aug. 5, 2014

(54) APPARATUS AND METHOD FOR ESTIMATING THE NUMBER OF OBJECTS INCLUDED IN AN IMAGE

(75) Inventors: Young-gwan Jo, Changwon (KR); Seung-in Noh, Changwon (KR); Yong-jin Park, Pohang-si (KR); Joon-hee Han, Pohang-si (KR)

(73) Assignees: Samsung Techwin Co., Ltd., Changwon (KR); Postech Academy-Industry Foundation, Pohang-si (KR)

( * ) Notice: Subject to any disclaimer, the term of this patent is extended or adjusted under 35 U.S.C. 154(b) by 175 days.

(21) Appl. No.: 13/458,390

(22) Filed: Apr. 27, 2012

(65) Prior Publication Data
US 2012/0308123 A1 Dec. 6, 2012

(30) Foreign Application Priority Data
May 31, 2011 (KR) .................. 10-2011-0052388

(51) Int. Cl.
*G06K 9/46* (2006.01)
*G06K 9/66* (2006.01)
*G06K 9/62* (2006.01)
*G06K 9/34* (2006.01)
*G06K 9/00* (2006.01)

(52) U.S. Cl.
USPC ........... 382/192; 382/155; 382/159; 382/173; 382/181; 382/190

(58) Field of Classification Search
None
See application file for complete search history.

(56) References Cited

U.S. PATENT DOCUMENTS
2010/0195865 A1 8/2010 Luff

FOREIGN PATENT DOCUMENTS
JP 2010079419 A 4/2010
KR 1020070051420 A 5/2007

*Primary Examiner* — Matthew Bella
*Assistant Examiner* — Jose M Torres
(74) *Attorney, Agent, or Firm* — Sughrue Mion, PLLC

(57) ABSTRACT

An apparatus and method for estimating the number of objects in an input image are disclosed. The apparatus includes: a learning unit that calculates counted values of a linear regression function by learning an arbitrary image; a separation unit that separates a foreground region and a background region of the input image; an extraction unit that searches for features that require an amount of calculation that is below a particular threshold from features having high correlation with each other feature and extracts the features from the separated foreground region; and an estimation unit that estimates the number of objects in the foreground region as a dependent variable by allocating the counted values of the linear regression function that are calculated by the learning unit and the features that are extracted by the extraction unit as independent variables of a linear regression function.

18 Claims, 6 Drawing Sheets

APPARATUS AND METHOD FOR ESTIMATING THE NUMBER OF OBJECTS INCLUDED IN AN IMAGE

CROSS-REFERENCE TO RELATED PATENT APPLICATION

This application claims priority from Korean Patent Application No. 10-2011-0052388, filed on May 31, 2011, in the Korean Intellectual Property Office, the disclosure of which is incorporated herein in its entirety by reference.

BACKGROUND

1. Field

Methods and apparatuses consistent with the exemplary embodiments relate to an apparatus and method for estimating the number of objects included in an image.

2. Description of the Related Art

Systems for counting the number of objects in an image by using an image monitoring device, i.e., a closed-circuit television (CCTV), may be used for two purposes. One purpose is to check the number of objects that enter a predetermined place by counting the number of objects that pass through an imaginary line or to manage the entrance of the objects. The other purpose is to count the number of objects that exist in a predetermined region and to use the counted number of objects to analyze consumers' preferences in a particular place, for example, in a shopping center.

SUMMARY

The exemplary embodiments provide an apparatus and method for estimating the number of objects included in an image that is captured by a surveillance camera for observing a predetermined space.

According to an aspect of an exemplary embodiment, there is provided an apparatus for estimating the number of objects, the apparatus including: a learning unit for calculating counted values of a linear regression function by learning an arbitrary image; a separation unit for separating a foreground region and a background region from an input image; an extraction unit for searching for features that require an amount of calculation that is below a particular threshold from features having high correlation with each other feature and extracting the features from the separated foreground region; and an estimation unit for estimating the number of objects as a dependent variable by allocating the counted values of the linear regression function that are calculated by the learning unit and the features that are extracted by the extraction unit as independent variables of the linear regression function.

The learning and the estimating of the number of objects may be performed in independent places.

The learning unit may calculate counted values by allocating the number of objects calculated from the arbitrary image as the dependent variable of the linear regression function and by allocating the features extracted from the foreground region separated from the image as the independent variables of the linear regression function.

The separation unit may approximate brightness distribution of each pixel of the image by using a Gaussian mixture model (GMM) and determine a region to which a measured pixel belongs, among the foreground region and the background region, by using a variable value of the approximated model.

The features that are estimated by the extraction unit may include: a first feature that indicates the number of pixels in the foreground region; a second feature that indicates the number of pixels in the foreground region that is at a boundary between the separated foreground region and background region; a third feature that indicates a histogram in a direction of an edge normal vector with respect to pixels on the second feature; and a fourth feature that indicates energy that is calculated using a probability density function from a gray level co-occurrence matrix (GLCM) of the foreground region.

A priority of the features may be set in a descending order from the first feature to the fourth feature.

According to an aspect of an exemplary embodiment, there is provided a method of estimating the number of objects, the method including: calculating counted values of a linear regression function by learning an arbitrary image; separating a foreground region and a background region from an input image; searching for features that require an amount of calculation that is below a particular threshold from features having high correlation with each other feature and extracting the features from the separated foreground region; and estimating the number of objects as a dependent variable by allocating the counted values of the learned linear regression function and the extracted features as independent variables of the linear regression function.

The calculating of the counted values of the linear regression function by learning the arbitrary image may include: allocating the number of objects calculated from the arbitrary image as the dependent variable of the linear regression function; allocating the features extracted from the foreground region separated from the image as the independent variables of the linear regression function; and calculating the counted values by using the dependent variable and the independent variables of the linear regression function.

The separating of the foreground region and the background region from the input image may include: approximating brightness distribution of each pixel of the image by using a Gaussian mixture model (GMM); and determining a region to which a measured pixel belongs, among the foreground region and the background region, by using a variable value of the approximated model.

The searching for the features that require an amount of calculation that is below a particular threshold from features having high correlation with each other feature and the extracting of the features from the separated foreground region features includes extracting the features, wherein the features may include: a first feature that indicates the number of pixels in the foreground region; a second feature that indicates the number of pixels in the foreground region that is at a boundary between the separated foreground region and background region; a third feature that indicates a histogram in a direction of an edge normal vector with respect to pixels on the second feature; and a fourth feature that indicates energy that is calculated using a probability density function from a gray level co-occurrence matrix (GLCM) of the foreground region.

A priority of the features may be set in a descending order from the first feature to the fourth feature.

BRIEF DESCRIPTION OF THE DRAWINGS

The above and other aspects of the exemplary embodiments will become more apparent by the following description thereof with reference to the attached drawings in which.

DETAILED DESCRIPTION OF THE EXEMPLARY EMBODIMENTS

Figure 1:
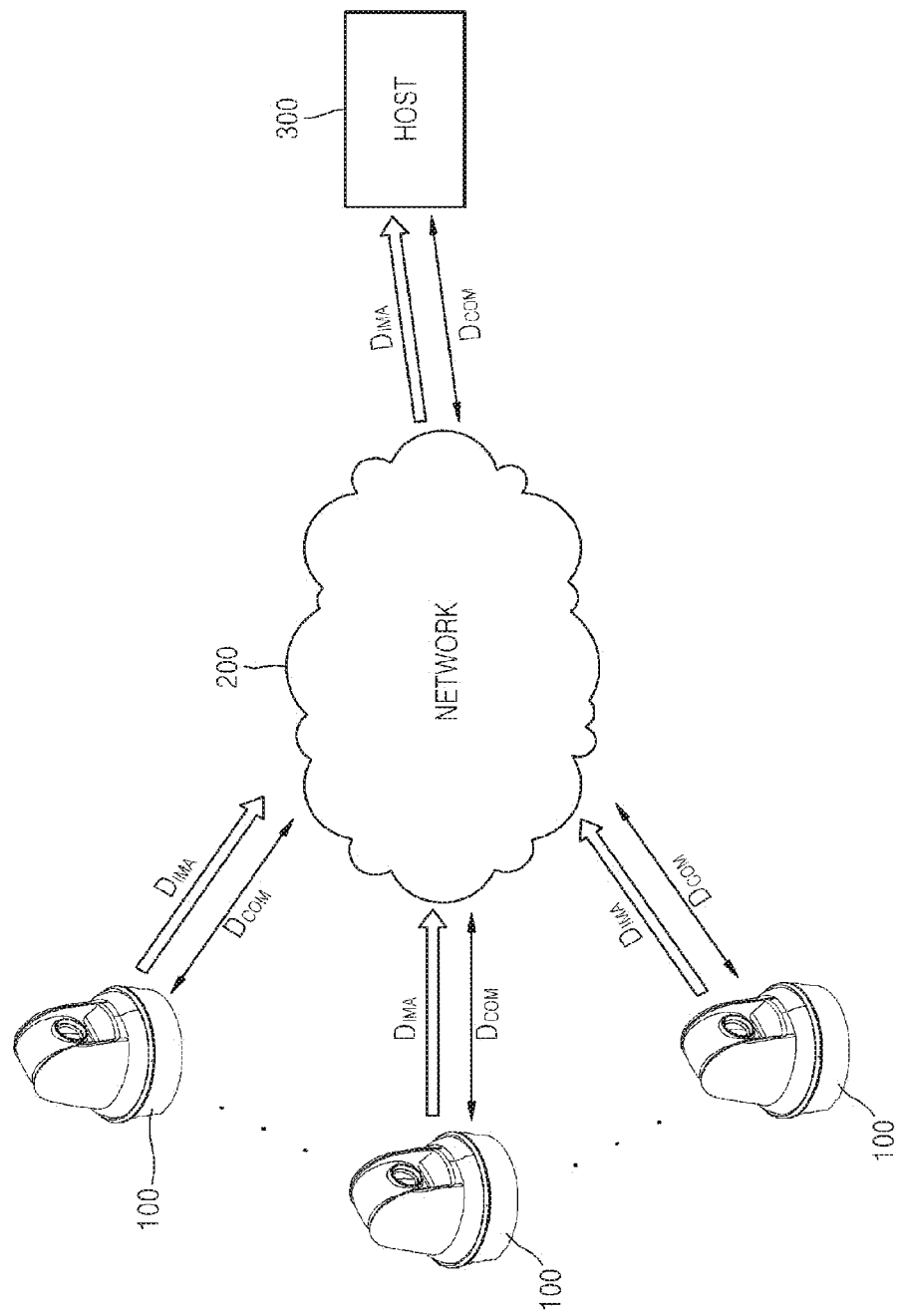
FIG. 1 is a schematic view of a system in which an apparatus for estimating the number of objects is used, according to an exemplary embodiment.

As the present application allows for various changes and numerous embodiments, exemplary embodiments will be illustrated in the drawings and described in detail in the written description. However, this is not intended to limit the claims to particular modes of practice, and it is to be appreciated that all changes, equivalents, and substitutes that do not depart from the spirit and technical scope of the application are encompassed in the claims. In the following description, certain detailed explanations of related art are omitted when it is deemed that they may unnecessarily obscure the essence of the exemplary embodiments.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the claims. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments will now be described more fully with reference to the accompanying drawings. The same elements are assigned the same reference numeral regardless of the figure number, and redundant explanations are omitted.

FIG. 1 is a schematic view of a system in which an apparatus for estimating the number of objects is used, according to an exemplary embodiment.

Referring to FIG. 1, a plurality of surveillance cameras 100 exchange data with a host 300 via a network 200. In detail, the plurality of surveillance cameras 100 communicate with the host 300 via a communication channel $D_{COM}$ and transmit a live view video image to the host 300 via an image data channel $D_{IMA}$. Only one surveillance camera may communicate with the host 300, or one surveillance camera or a plurality of surveillance cameras may communicate with a plurality of hosts 300, and various modifications are possible.

Here, the network 200 that constitutes the communication channel $D_{COM}$ and the image data channel $D_{IMA}$ may include all units that transmit or receive data or instructions in a wired or wireless manner. For example, the network 200 may connect the surveillance camera 100 and the host 300 in a wired manner via a cable or in a wireless manner using a wireless local area network (LAN) or the like.

The surveillance camera 100 is not limited to communicating with only the host 300 illustrated in FIG. 1 and may communicate with a device including a display screen. For example, the host 300 may be a personal computer (PC) or the like. The host 300 may store a live view video image that is captured by the surveillance camera 100, if desired.

Figure 2:
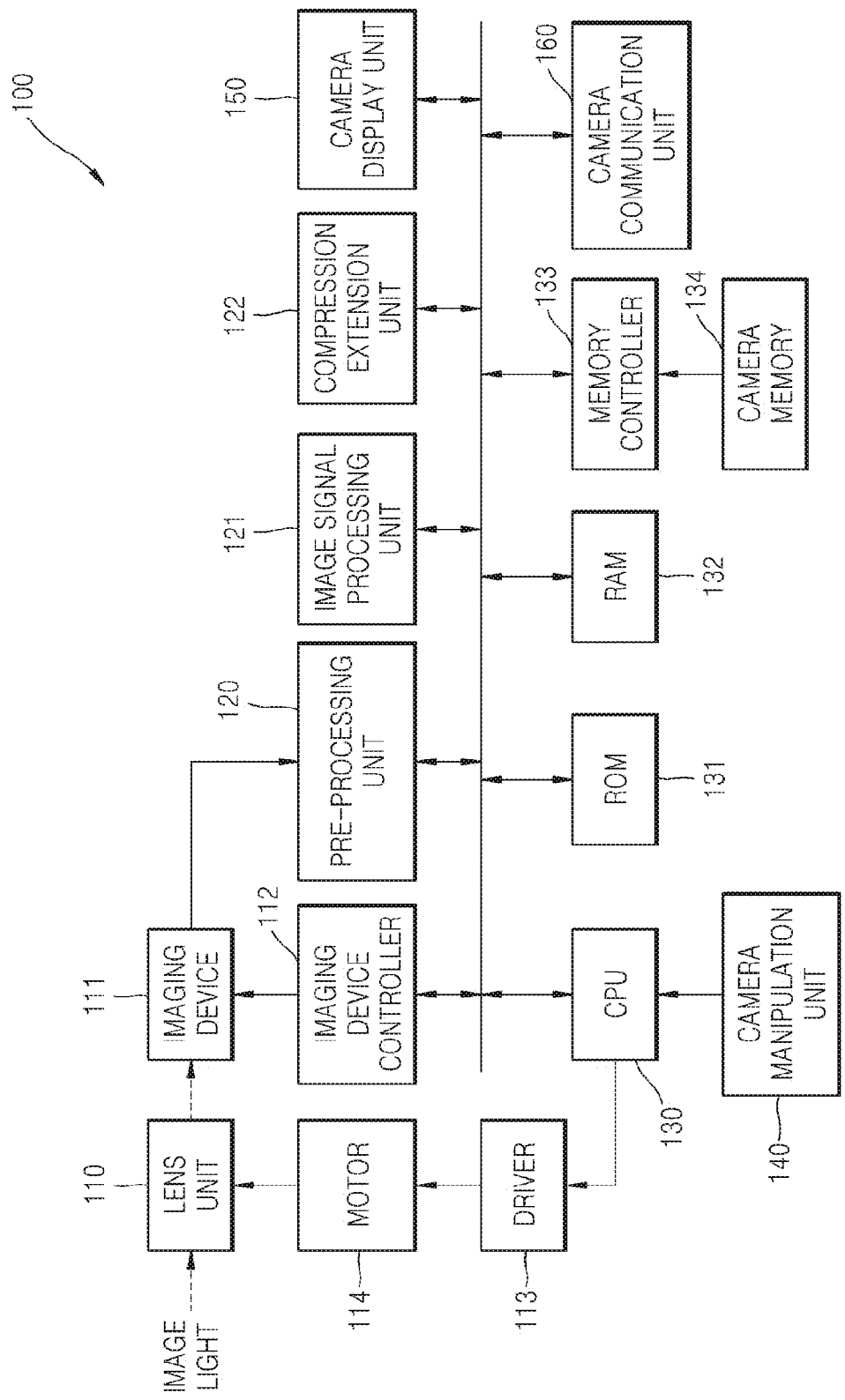
FIG. 2 is a block diagram of a surveillance camera in which the apparatus for estimating the number of objects illustrated in FIG. 1 is used, according to an exemplary embodiment.

FIG. 2 is a block diagram of a surveillance camera 100 in which the apparatus for estimating the number of objects illustrated in FIG. 1 is used, according to an exemplary embodiment.

Referring to FIG. 2, the surveillance camera 100 may include a lens unit 110, an imaging device 111, an imaging device controller 112, a driver 113, a motor 114, a pre-processing unit 120, an image signal processor 121, a compression extension unit 122, a central processing unit (CPU) 130, a read-only memory (ROM) 131, a random-access memory (RAM) 132, a memory controller 133, a camera memory 134, a camera manipulation unit 140, a camera display unit 150, and a camera communication unit 160.

The lens unit 110 is an optical system that forms external light information on the imaging device 111 and transmits light from a subject through the imaging device 111. The lens unit 110 includes a lens group including a zoom lens that varies a focal length and a focus lens that adjusts a focus, and a diaphragm that adjusts the amount of light transmitted.

The zoom lens, diaphragm and the focus lens of the lens unit 110 are driven by the motor 114 to which a driving signal is applied by the driver 113.

The imaging device 111 is an example of a photoelectric conversion device and includes a plurality of photoelectric conversion devices that capture incident image light transmitted through the lens unit 110 and convert the image light into an electric signal. Each of the plurality of photoelectric conversion devices generates an electric signal from incident light, thereby generating an image signal. In this regard, the imaging device 111 captures a frame image at a predetermined period according to a timing signal that is transmitted from the imaging device controller 112, thereby generating an image signal periodically. The imaging device 111 may be a charge-coupled device (CCD) sensor, a complementary metal-oxide semiconductor (CMOS) sensor, or the like. The imaging device 111 outputs a digital signal that is generated by photoelectric conversion and analog/digital conversion to the pre-processing unit 120.

The imaging device controller 112 generates a timing signal and controls the imaging device 111 to capture an image in synchronization with the timing signal.

The pre-processing unit 120 processes the digital signal that is output from the imaging device 111, thereby generating an image signal that may be image-processed. The pre-processing unit 120 outputs the image signal to the image signal processor 121. In addition, the pre-processing unit 120 controls read and write image data from and on the RAM 132.

The image signal processor 121 generates an image signal that is image-processed based on a white balance (WB) control value, a γ-value, a contour emphasis control value, or the like, in response to the image signal received by the pre-processing unit 120. The image-processed image signal may be applied to the compression extension unit 122. Alternatively, the image-processed image signal may be used as a live view image and may be transmitted to the camera display unit 150 via the RAM 132.

The image signal processor 121 separates foreground regions and background regions from frame images that are periodically captured by the imaging device 110 and estimates the number of objects by using features that are extracted from the foreground regions and counted values of a learned linear regression function. The function of the image signal processor 121 will be described below with reference to FIGS. 3 and 4 in detail.

In this regard, the image signal processor 121 that performs the function of estimating the number of objects may be performed externally from the surveillance camera. When hardware that may perform image processing, such as a CPU, a digital signal processor (DSP), RAM, an image processing chip or the like, is mounted in the surveillance camera, the number of objects may be estimated by the surveillance camera. In addition, the image signal processor 121 may be disposed on a calculation apparatus, such as a computer (not shown) that is connected to the surveillance camera via a network and may receive an image in real-time, so as to perform the function of estimating the number of objects.

The compression extension unit 122 receives the image signal before compression and compresses the image signal according to a compression standard, such as MPEG, ACI, MOV, ASD, or the like. The compression extension unit 122 transmits an image file including image data that is generated by compression to the memory controller 133. Alternatively, the compression extension unit 122 may input the image file to the camera communication unit 160 and may transmit the image file to the host 300 that controls the surveillance camera 100 via the camera communication unit 160. In addition, when the surveillance camera 100 includes the camera display unit 150, the compression extension unit 122 extracts the image file that is stored in the camera memory 134 from the camera memory 134 and performs extension on the image file so that the image file may be reproduced by the camera display unit 150.

The CPU 130 functions as an arithmetic processing unit and a control unit by using a program and controls operations of the elements included in the surveillance camera 100. The CPU 130 outputs a signal to the driver 113 based on focus control or exposure control, for example, thereby driving the motor 114. In addition, the CPU 130 controls the elements of the surveillance camera 100 based on a signal transmitted from the camera manipulation unit 140. In addition, in the current exemplary embodiment, only one CPU 130 is provided. However, a plurality of CPUs, each of which executes instructions transmitted from a signal system and instructions transmitted from a manipulation system, may be provided.

A user's setting date relating to a photographing condition or the like may be stored in the ROM 131. In addition, an algorithm that is used in controlling the surveillance camera 100 by using the CPU 130 may be used in the ROM 131. The ROM 131 may an electrically erasable and programmable read-only memory (EEPROM) or the like.

The image signal that is output by the pre-processing unit 120 and various data including data generated by the image signal processor 121 may be temporarily stored in the RAM 132. The RAM 132 may be a dynamic RAM (DRAM).

The memory controller 133 controls writing of the image data on the camera memory 134 or reading of the image data recorded on the camera memory 134 or setting information. The camera memory 134 may be an optical disc, such as a compact disc (CD), a digital versatile disc (DVD), a Blue-ray disc, or the like, an optical magnetic disc, a magnetic disc, a semiconductor storage medium or the like, and the image data is recorded on the camera memory 134. The image data may be image data included in the image file generated by the compression extension unit 122. The memory controller 133 and the camera memory 134 may not be necessarily installed in the surveillance camera 100. When the surveillance camera 100 is a surveillance camera connected to the host 300 via the network 200, a server memory for storing image data or the like may be installed in the host 300 that controls the surveillance camera 100. In this case, image data or the like may be transmitted to the host 300 from the surveillance camera 100, via the network 200.

The camera manipulation unit 140 includes various buttons or levers that are installed in the surveillance camera 100, for example, and transmits a manipulation signal to the CPU 130 based on a user's manipulation. However, the camera manipulation unit 140 is not necessarily installed in the surveillance camera 100. When the surveillance camera 100 is connected to the image signal processor 121 via the network 200, a server manipulation unit may be installed in the host 300 that controls the surveillance camera 100, and the server manipulation unit may control the operation of the surveillance camera 100 in response to a signal applied to the server manipulation unit 330.

The camera display unit 150 displays a captured image, an image that is captured and is stored in the camera memory 134, or an image that is extended by the compression extension unit 122. In addition, the camera display unit 150 may display various setting screens for controlling the surveillance camera 100.

The camera communication unit 160 transmits the live view image that is captured by the surveillance camera 100 or the image that is captured and is stored in the camera memory 134 to an external device, for example, the host 300, via the network 200. In addition, the camera communication unit 160 receives various instruction signals that are transmitted from the host 300 via the network 200.

Figure 3:
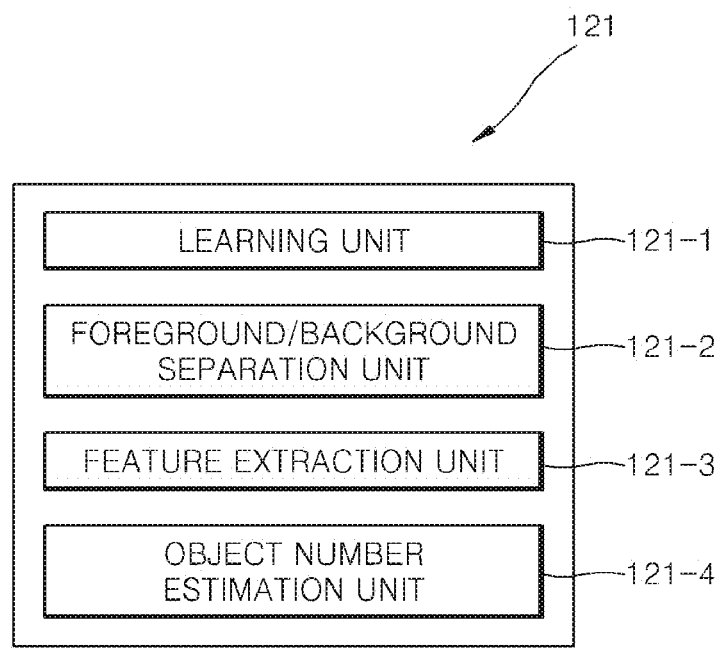
FIG. 3 is a detailed block diagram of the apparatus for estimating the number of objects illustrated in FIG. 1 according to an exemplary embodiment.

FIG. 3 is a detailed block diagram of the image signal processor 121 that is used as the apparatus for estimating the number of objects illustrated in FIG. 1.

The image signal processor 121 separates foreground regions and background regions of frame images that are periodically captured by the imaging device 110 and estimates the number of objects by using features that are extracted from the foreground regions and counted values of a learned linear regression function. To this end, the image signal processor 121 includes a learning unit 121-1, a foreground/background separation unit 121-2, a feature extraction unit 121-3, and an object number estimation unit 121-4.

The learning unit 121-1 uses the counted values of the linear regression function that are learned and calculated in estimating the number of objects according to the current exemplary embodiment. To this end, the calculation of the counted values by learning will be described below. The learning unit 121-1 separates a foreground region and a background region of a frame image that is captured in an arbitrary place by using a Gaussian mixture model and extracts twelve-dimensional features from the separated foreground region. Subsequently, the learning unit 121-1 allocates the number of objects that exist in the separated foreground region as a dependent variable Y and allocates the twelve-dimensional features as independent variables $X_1$ to $X_{12}$, thereby calculating counted values $C_1$ to $C_{12}$ after applying the number of objects and the twelve-dimensional features to a linear regression function defined in the following Equation 1:

$$Y = C_0 + C_1 X_1 + C_2 X_2 + \ldots + C_{12} X_{12} \tag{1}$$

where the dependent variable Y represents the number of objects that exist in the foreground region, and the independent variables $X_1$ to $X_{12}$ represent twelve-dimensional feature values, and the counted values $C_1$ to $C_{12}$ represent counted values for estimating the number of objects. A plurality of linear regression function equations are established from frame images that are input in real-time, and the counted values $C_1$ to $C_{12}$ may be obtained from the plurality of linear regression function equations. The learned counted values $C_1$ to $C_{12}$ are used as actual counted values when the number of objects is estimated using a linear regression function. In the current exemplary embodiment, a learning place may be independent of a place for estimating the number of objects. The Gaussian mixture model mentioned when describing the learning unit 121-1 and extraction of the twelve-dimensional features will be described now in detail.

Figure 4:
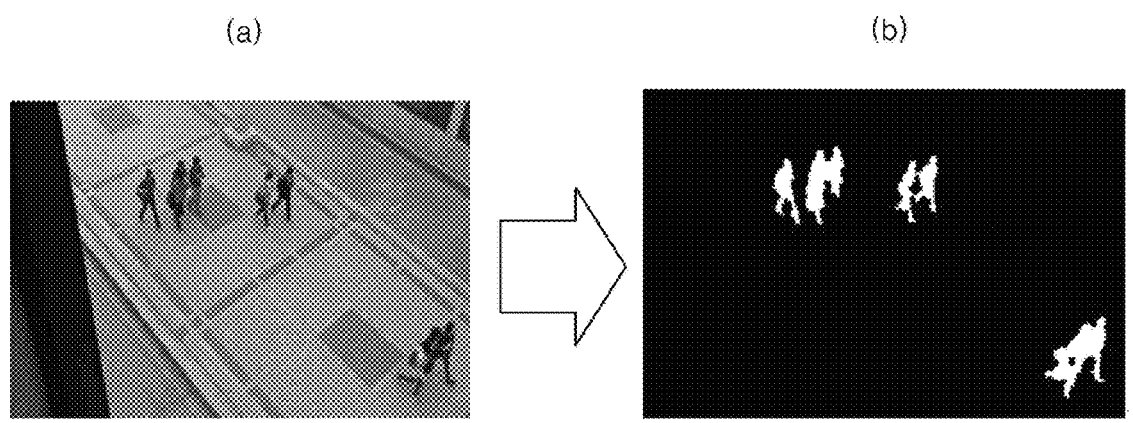
FIG. 4A is a frame image.
FIG. 4B is an image, of which a foreground region and a background region are separated from the frame image according to an exemplary embodiment.

The foreground/background separation unit 121-2 separates foreground regions and background regions of frame images that are periodically captured by the lens unit 110. FIG. 4 illustrates an example (FIG. 4(b)) of an image, of which a foreground region and a background region are separated from a frame image (FIG. 4(a)). White portions of FIG. 4(b) represent the separated foreground region, and a black portion thereof represents the separated background region.

There are several methods of separating a foreground/background region from a frame image. For example, a foreground/background region may be separated by using a frame difference method whereby two consecutive frame images are compared with each other and foreground regions of the frame frames are searched for by using a difference between the frame images. There is another method of separating a foreground/background region from a frame image by modeling color distribution of each pixel by using one Gaussian function or several Gaussian functions. In addition, a foreground/background region of a frame image may be separated not by modeling color distribution by using a particular function but by representing color distribution as probability distribution. Color is generally used in separating a foreground/background region from a frame image but an edge or a texture except for color may be used therein. There is a method of using a "local binary pattern" or "mixture of dynamic texture" as a method using a texture.

A Gaussian mixture model (GMM), from several methods of separating a foreground/background region of a frame image, is used in the current exemplary embodiment. However, the exemplary embodiment is not limited thereto, and any algorithm for separating a foreground/background region of a frame image may be used. The GMM uses a probabilistic learning method whereby brightness distribution of each pixel of an image is approximated using the GMM and a region to which a measured pixel belongs, among the foreground region and the background region, is determined by using a variable value of the approximated model. In the GMM, the foreground region and the background region of the frame image may be separated in real-time.

The feature extraction unit 121-3 searches for twelve-dimensional features that require an amount of calculation that is below a particular threshold from features having high correlation with each other feature and extracts the twelve-dimensional features from the separated foreground region. The twelve-dimensional features that are extracted by the feature extraction unit 121-3 may include a first feature that indicates the number of pixels in the separated foreground region, a second feature that indicates the number of pixels in the foreground region located at a boundary between the separated foreground region and background region, a third feature that indicates a histogram in a direction of an edge normal vector with respect to pixels of the second feature, and a fourth feature that indicates energy that is calculated using a probability density function from gray level co-occurrence matrix (GLCM) of the separated foreground region. Here, each of the first feature and the second feature is one-dimensional, and the third feature is six-dimensional, and the fourth feature is four-dimensional so that twelve-dimensional features are constituted in total. In addition, the priority of the twelve-dimensional features may be set in a descending order from the first feature to the fourth feature.

For example, when the foreground/background region is separated from the frame image by using the aforementioned "mixture of dynamic texture", twenty-nine-dimensional features including a segment feature, an internal edge feature, a texture feature, and the like are extracted from the foreground region. In the current exemplary embodiment, the feature extraction unit 121-3 may improve the speed of counting the number of objects by extracting the twelve-dimensional features.

In the current exemplary embodiment, reducing the number of dimensions of features affects a learning time and improves the calculation speed. In other words, in the related art counting of the number of objects and a learning function for counting the number of objects need to be generally performed in the sample place, whereas, in the current exemplary embodiment, counting of the number of objects and a learning function for counting the number of objects may be performed in independent places. This is because the size of the twenty-nine-dimensional space is greater than the size of the twelve-dimensional space. As a result of learning a regression function, the position of the feature space corresponds to an object-counted value. The space of the feature space that does not correspond to the object-counted value is estimated from the learned feature-object counted value correspondence relationship. However, the accuracy of counting in the learned correspondence relationship is higher than the accuracy of counting in the estimated correspondence relationship. Since the number of images that is used in learning is limited and the space of the twenty-nine-dimensional feature is greater than the space of the twelve-dimensional feature, the number of estimated feature-object counted value correspondences in the twenty-nine-dimensional feature is greater than that of the twelve-dimensional feature. Thus, in the case of "mixture of dynamic texture", an error in counting the number of objects may be increased. However, in the current exemplary embodiment, a feature space is relatively small compared to the related art, and the number of estimated feature-object counted value correspondences is small. This means that, even when a feature that is extracted from an image captured in a different place from a place where counting of the number of objects is learned is used, an error in counting the number of objects is relatively small.

The object number estimation unit 121-4 estimates the number of objects as the dependent variable Y by allocating the counted values $C_1$ to $C_{12}$ of the linear regression function that are calculated by the learning unit 121-1 and the twelve-dimensional features $X_1$ to $X_{12}$ that are extracted by the feature extracting unit 121-3 by using Equation 1 defined above.

Thus, the number of objects may be estimated with the occurrence of a reduced error and improved speed.

Figure 5:
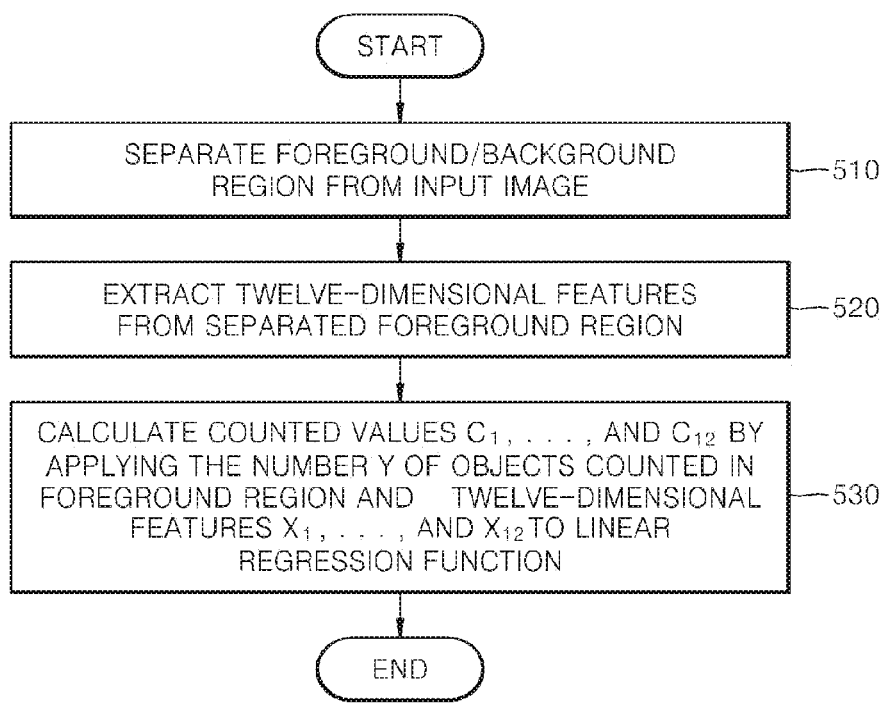
FIG. 5 is a flowchart illustrating a learning operation of a method of estimating the number of objects, according to an exemplary embodiment.

Next, a method of estimating the number of objects, according to an exemplary embodiment, is described with reference to FIGS. 5 and 6.

First, a learning operation of the method of estimating the number of objects according to an exemplary embodiment will be described with reference to FIG. 5. In the exemplary embodiment, the learning place may be different from a place where the number of objects is estimated, as described above.

First, a foreground region and a background region from a frame image that is captured in an arbitrary place are separated by using a GMM in operation 510.

Next, twelve-dimensional features, as described above, are estimated from the separated foreground region in operation 520.

In operation 530, the number of objects in the separated foreground region is allocated as a dependent variable Y, and the twelve-dimensional features are allocated as independent variables $X_1$ to $X_{12}$ and are applied to the linear regression function defined in Equation 1, thereby calculating counted values $C_1$ to $C_{12}$. The learned and calculated counted values $C_1$ to $C_{12}$ are used as actual counted values of the linear regression function when the number of objects is estimated in an arbitrary place.

Next, the method of estimating the number of objects, according to an exemplary embodiment, is described with reference to FIG. 6.

Figure 6:
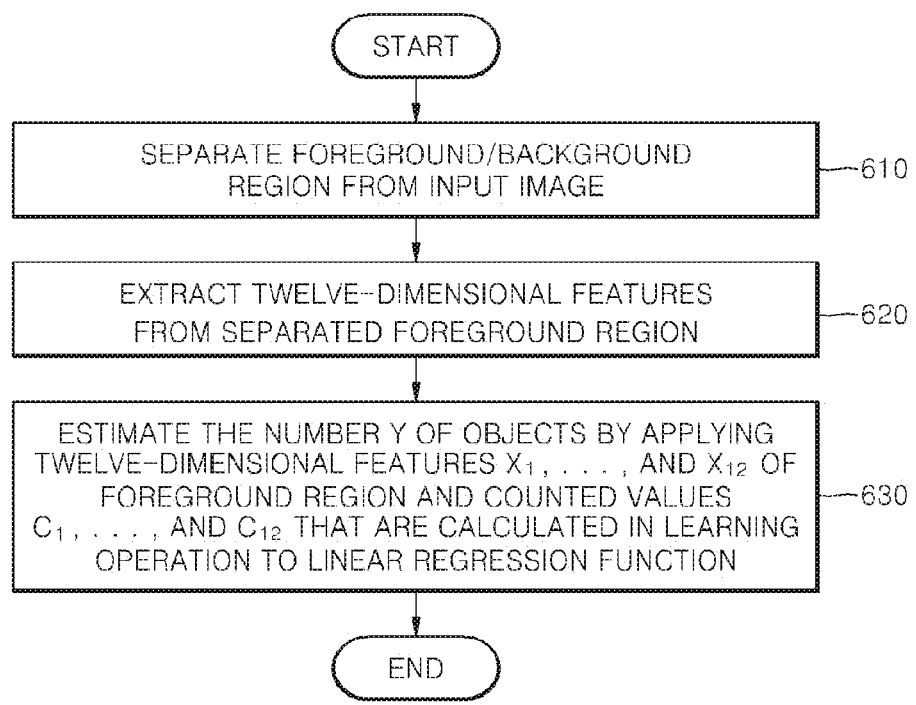
FIG. 6 is a flowchart illustrating a method of estimating the number of objects using counted values calculated in the learning operation, according to another exemplary embodiment.

Referring to FIG. 6, foreground regions and background regions from frame images that are periodically captured by the imaging device 110 are separated in operation 610.

There are several methods of separating foreground and background region, such as by using a frame difference, a single Gaussian model, a GMM, a mixture of dynamic texture models, or the like. In particular, in the current exemplary embodiment, the foreground region and the background region are separated by using the GMM.

Next, twelve-dimensional features that require an amount of calculation that is below a particular threshold are searched for from features having high correlation with each other feature and are extracted from the separated foreground region in operation 620.

The twelve-dimensional features refer to a first feature that indicates the number of pixels in the separated foreground region, a second feature that indicates the number of pixels in the foreground region located at a boundary between the separated foreground region and background region, a third feature that indicates a histogram in a direction of an edge normal vector with respect to pixels of the second feature, and a fourth feature that indicates energy that is calculated using a probability density function from GLCM of the separated foreground region. Here, each of the first feature and the second feature is one-dimensional, the third feature is six-dimensional, and the fourth feature is four-dimensional so that twelve-dimensional features are constituted totally. In addition, the priority of the twelve-dimensional features may be set in a descending order from the first feature to the fourth feature.

Next, in operation 630, the number of objects (Y) is estimated by allocating the counted values $C_1$ to $C_{12}$ of the learned linear regression function and the extracted twelve-dimensional features, as independent variables $X_1$ to $X_{12}$ of a linear regression function, by using Equation 1 defined above.

The exemplary embodiments shown and described herein are illustrative and are not intended to otherwise limit the scope of the invention in any way. For the sake of brevity, conventional electronics, control systems, software development, and other functional aspects of the systems (and components of the individual operating components of the systems) may not be described in detail. Furthermore, the connecting lines or connectors shown in the various figures presented are intended to represent exemplary functional relationships and/or physical or logical connections between the various elements. It should be noted that many alternative or additional functional relationships, physical connections or logical connections may be present in a practical device. Moreover, no item or component is essential to the practice of the exemplary embodiments unless the element is specifically described as "essential" or "critical".

The use of the terms "a" and "an" and "the" and similar references in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better explain the exemplary embodiments and is not intended to be limiting. Numerous modifications and adaptations will be readily apparent to those skilled in this art without departing from the spirit and scope of the present invention.

The term "unit," as used herein, means, but is not limited to, a software or hardware component, such as a Field Programmable Gate Array (FPGA) or an Application Specific Integrated Circuit (ASIC), which performs certain tasks. A unit may advantageously be configured to reside in an addressable storage medium and to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented so as to execute one or more Central Processing Units (CPUs) in a device.

As described above, according to the exemplary embodiments, a GMM, extraction of twelve-dimensional features, and a linear regression function are used in estimating the number of objects so that the speed of estimating the number of objects may be improved and the occurrence of an error may be reduced when a foreground/background region of a frame image are separated.

While exemplary embodiments have been particularly shown and described, it will be understood by those of ordinary skill in the art that various changes in form and details may be made therein without departing from the spirit and scope of the following claims.

What is claimed is:

1. An apparatus for estimating the number of objects in an input image, the apparatus comprising:
at least one processor which implements:
a learning unit that calculates counted values of a linear regression function by learning an arbitrary image;
a separation unit that separates a foreground region and a background region of the input image;
an extraction unit that searches for features that require an amount of calculation that is below a particular threshold from features having high correlation with each other feature and extracts the features from the separated foreground region; and
an estimation unit that estimates a number of objects in the foreground region as a dependent variable by allocating the counted values of the linear regression function that are calculated by the learning unit and the features that are extracted by the extraction unit as independent variables of the linear regression function.

2. The apparatus of claim 1, wherein the learning and the estimating of the number of objects are performed in independent places within the input image and the arbitrary image.

3. The apparatus of claim 1, wherein the learning unit calculates counted values by allocating a number of objects calculated from the arbitrary image as the dependent variable of the linear regression function and by allocating the features extracted from a foreground region separated from the arbitrary image as the independent variables of the linear regression function.

4. The apparatus of claim 1, wherein the separation unit approximates a brightness distribution of each pixel of the input image by using a Gaussian mixture model (GMM) and determines a region to which a measured pixel belongs, among the foreground region and the background region, by using a variable value of the GMM.

5. The apparatus of claim 1, wherein the features that are estimated by the extraction unit comprise:
 a first feature that indicates a number of pixels in the foreground region;
 a second feature that indicates a number of pixels in the foreground region located at a boundary between the foreground region and background region;
 a third feature that indicates a histogram in a direction of an edge normal vector with respect to pixels included in the number of pixels indicated by the second feature; and
 a fourth feature that indicates energy that is calculated using a probability density function from a gray level co-occurrence matrix (GLCM) of the foreground region.

6. The apparatus of claim 5, wherein a priority of the features is set in a descending order from the first feature to the fourth feature.

7. The apparatus of claim 5, wherein a priority of the first feature is higher than a priority of the second, third, and fourth features.

8. The apparatus of claim 5, wherein the first feature is a one-dimensional feature, the second feature is a one-dimensional feature, the third feature is a six-dimensional feature, and the fourth feature is a four-dimensional feature.

9. The apparatus of claim 1, wherein the estimation unit estimates the number of objects in the foreground region according to the following equation:

$$Y = C_0 + C_1 X_1 + C_2 X_2 + \ldots + C_{12} X_{12};$$

wherein Y represents the number of objects in the foreground region, $C_0$ to $C_{12}$ represent the counted values of the linear regression function, and $X_1$ to $X_{12}$ represent the features extracted by the extraction unit.

10. A method of estimating the number of objects in an input image performed by an image processing apparatus, the method comprising:
 calculating counted values of a linear regression function by learning an arbitrary image;
 separating a foreground region and a background region of an input image;
 searching for features that require an amount of calculation that is below a particular threshold from features having high correlation with each other feature;
 extracting the features from the separated foreground region; and
 estimating, by at least one processor, a number of objects in the foreground region as a dependent variable by allocating the counted values of the learned linear regression function and the extracted features as independent variables of the linear regression function.

11. The method of claim 10, wherein the calculating of the counted values of the linear regression function by learning the arbitrary image comprises:
 allocating a number of objects calculated from the arbitrary image as the dependent variable of the linear regression function;
 allocating the features extracted from a foreground region separated from the arbitrary image as the independent variables of the linear regression function; and
 calculating the counted values by using the dependent variable and the independent variables of the linear regression function.

12. The method of claim 10, wherein the separating of the foreground region and the background region from the input image comprises:
 approximating a brightness distribution of each pixel of the input image by using a Gaussian mixture model (GMM); and
 determining a region to which a measured pixel belongs, among the foreground region and the background region, by using a variable value of the GMM.

13. The method of claim 10, wherein the searching for the features that require an amount of calculation that is below a particular threshold from features having high correlation with each other feature and the extracting of the features from the separated foreground region features comprises extracting the features, wherein the features comprise:
 a first feature that indicates a number of pixels in the foreground region;
 a second feature that indicates a number of pixels in the foreground region located at a boundary between the separated foreground region and background region;
 a third feature that indicates a histogram in a direction of an edge normal vector with respect to pixels included in the number of pixels indicated by the second feature; and
 a fourth feature that indicates energy that is calculated using a probability density function from a gray level co-occurrence matrix (GLCM) of the foreground region.

14. The method of claim 13, wherein a priority of the features is set in a descending order from the first feature to the fourth feature.

15. The method of claim 13, wherein a priority of the first feature is higher than a priority of the second, third, and fourth features.

16. The method of claim 13, wherein the first feature is a one-dimensional feature, the second feature is a one-dimensional feature, the third feature is a six-dimensional feature, and the fourth feature is a four-dimensional feature.

17. The method of claim 10, wherein the learning of the arbitrary image and the estimating of the number of objects in the foreground region are performed in independent places within the input image and the arbitrary image.

18. The method of claim 10, wherein the estimating of the number of objects in the foreground region comprises estimating the number of objects in the foreground region according to the following equation:

$$Y = C_0 + C_1 X_1 + C_2 X_2 + \ldots + C_{12} X_{12};$$

wherein Y represents the number of objects in the foreground region, $C_0$ to $C_{12}$ represent the counted values of the linear regression function, and $X_1$ to $X_{12}$ represent the extracted features of the separated foreground region.

* * * * *